United States Patent
Lin

(10) Patent No.: US 8,156,335 B2
(45) Date of Patent: Apr. 10, 2012

(54) IP ADDRESS SECURE MULTI-CHANNEL AUTHENTICATION FOR ONLINE TRANSACTIONS

(75) Inventor: Paul Lin, Fremont, CA (US)

(73) Assignee: F2Ware, Inc., San Jose, CA (US)

( * ) Notice: Subject to any disclaimer, the term of this patent is extended or adjusted under 35 U.S.C. 154(b) by 400 days.

(21) Appl. No.: 12/553,056

(22) Filed: Sep. 2, 2009

(65) Prior Publication Data

US 2010/0107228 A1 Apr. 29, 2010

Related U.S. Application Data

(60) Provisional application No. 61/093,689, filed on Sep. 2, 2008.

(51) Int. Cl.
*H04L 29/06* (2006.01)

(52) U.S. Cl. ........................................... 713/168

(58) Field of Classification Search ............ 713/168
See application file for complete search history.

(56) References Cited

U.S. PATENT DOCUMENTS

| | | | |
|---|---|---|---|
| 6,934,858 B2* | 8/2005 | Woodhill | 726/5 |
| 7,765,580 B2* | 7/2010 | Vandergeest et al. | 726/2 |
| 7,912,927 B2* | 3/2011 | Thangadurai et al. | 709/220 |
| 7,953,887 B2* | 5/2011 | Boss et al. | 709/238 |
| 2002/0169988 A1* | 11/2002 | Vandergeest et al. | 713/201 |
| 2005/0268107 A1* | 12/2005 | Harris et al. | 713/182 |
| 2006/0041755 A1* | 2/2006 | Pemmaraju | 713/182 |
| 2006/0200855 A1* | 9/2006 | Willis | 726/2 |
| 2007/0056022 A1* | 3/2007 | Dvir | 726/4 |
| 2007/0220594 A1* | 9/2007 | Tulsyan | 726/5 |
| 2008/0034404 A1* | 2/2008 | Pereira et al. | 726/2 |
| 2009/0288148 A1* | 11/2009 | Headley et al. | 726/5 |

* cited by examiner

*Primary Examiner* — Ponnoreay Pich
(74) *Attorney, Agent, or Firm* — Thomas, Kayden, Horstemeyer & Risley, LLP

(57) ABSTRACT

A method for multi-factor authenticating of a user using an application server and an authentication server is disclosed. The method includes receiving from the application server a first source IP address associated with a request for authenticating from the user browser program to the application server. The method also includes receiving from the user browser program a request to perform additional authentication between the user browser program and the authentication server using a separate communication channel. The method additionally includes comparing the first source IP address with a second source IP address associated with the request to perform the additional authentication and failing, if the first source IP address does not match the second source IP address, authentication of the user.

20 Claims, 4 Drawing Sheets

IP ADDRESS SECURE MULTI-CHANNEL AUTHENTICATION FOR ONLINE TRANSACTIONS

PRIORITY CLAIM

This application claims priority under 35 USC 119(e) to an earlier filed provisional patent application entitled "IP ADDRESS SECURE MULTI-CHANNEL AUTHENTICATION FOR ONLINE TRANSACTIONS", Filed Sep. 2, 2008, Application No. 61/093,689, which is incorporated by reference in its entirety herein.

BACKGROUND OF THE INVENTION

Online transactions, including financial transactions and other confidential transactions, have long been employed to allow two parties to conduct business. In a typical online transaction, the user (such as, for example, a bank customer) uses a client browser on a computer to established a session with an application server (such as, for example, the banking server that is operated by the bank) and accomplishes the desired transaction (such as, for example, transferring money from one account to another account). Since online transactions are often conducted via the Internet, which is a global public network of routers, servers, trunks, etc., security is always a paramount concern.

Risks to online transaction security include risks that an unauthorized third party may be able to obtain the authentication information (such as userid and password) and may be able to subsequently conduct fraudulent transactions to the detriment of the user. For example, if only a userid and password are required to log into a bank from any computer, a third party with access the user's userid and password would be able to log in from anywhere and perform any transaction that the user is able to perform, including for example transferring money to an account under control by the unauthorized third party.

The stealing of userid and password may be accomplished by techniques such as Trojans (generically referring to client-resident applications that snoop the userid and password as they are typed in by the user and relay the userid and password to the fraudster). Another technique involves phishing. In an example phishing scenario, the user may receive an email with a message requesting the user to log into a website purported to belong to a merchant with whom the user has previously done business (e.g., XYZ Bank). The email contains a link to be activated by the user. If the user activates the link that is provided with the phishing email, the user is presented with a website that has a substantially identical look-and-feel to that of the real website (e.g., XYZ Bank). However, this website actually belongs to the fraudster. Information entered by the user into the fraudster's website, which mimics the look-and-feel of the real website, would be recorded and used to subsequently perpetrate fraud on the user. By way of example, the fraudster may employ the entered userid and password to log into the account of the user and perform an unauthorized transfer of money.

One method of combating frauds such as Trojans or phishing involves using second factor authentication, wherein additional information is required for authentication. With the userid/password acting as the First authenticating factor, the application server (e.g., the bank application), also requires additional authentication based on hardware that is possessed by the device being used for access or by the user. For example, a hardware token or ATM card may be required for the second factor authentication. Software may also be used as the second factor authentication.

The aforementioned touches only on some broad categories of online transaction risks. There are other risks currently existing and they are well known and will not be belabored here. Further, techniques are continually developed to combat online fraud. In response, the fraudsters continually develop techniques to defeat the newly implemented security measures, including authentication schemes.

In view of the transaction risks that are currently existing and/or that are being developed in response to security measures, improved authentication techniques are desired.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
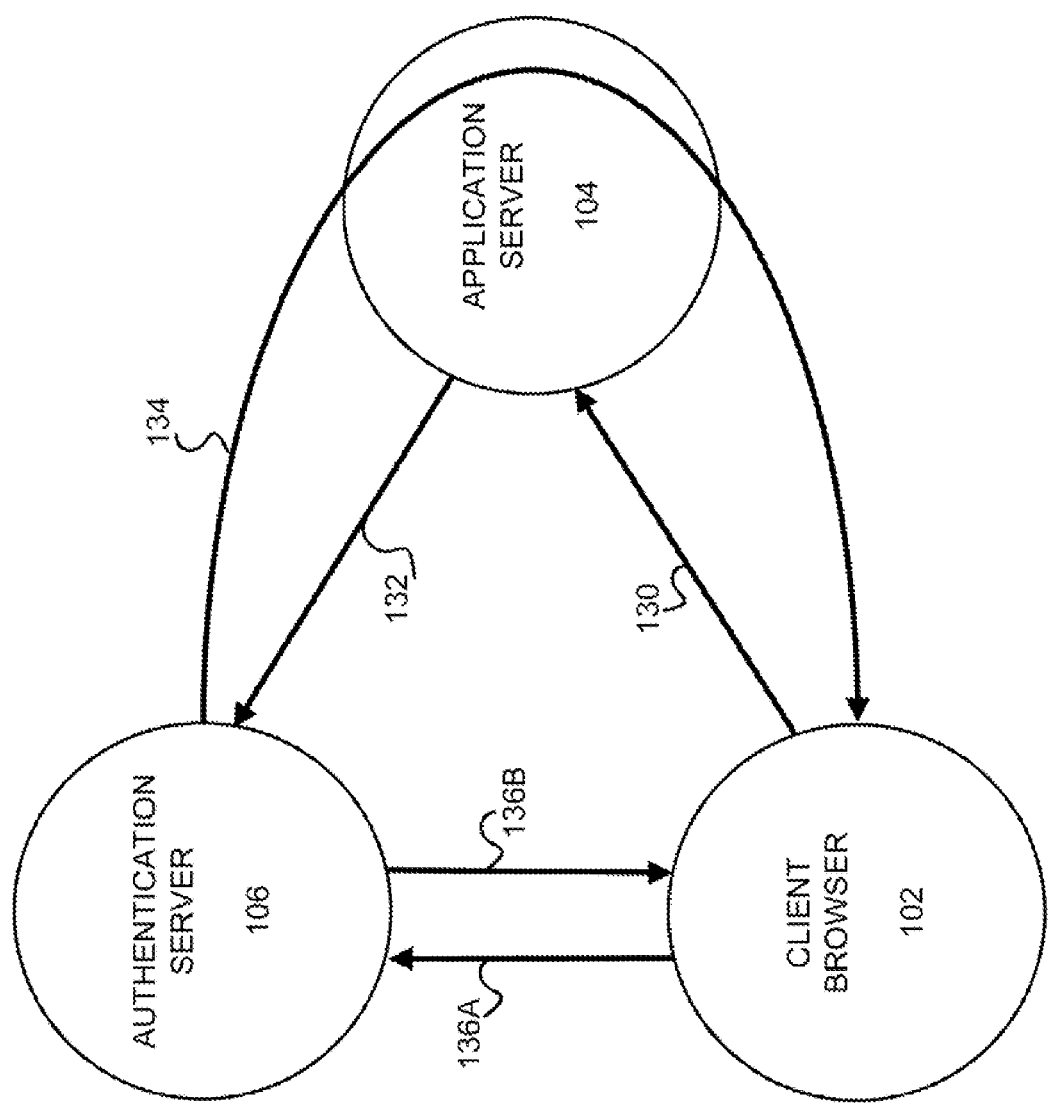
FIG. 1 shows a typical multi-channel authentication scheme in which client browser authenticates with both application sever and authentication server.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In the multi-channel authentication scheme, the user is required to access not only the application server (e.g., the aforementioned XYZ bank) but also an authentication server on a separate communication for the purpose of authenticating himself. Briefly speaking, a multi-channel authentication scheme involves three parties: the user, the application server, and the authentication server.

Generally speaking, the user first logs into the application server (e.g., XYZ bank) and establishes his first factor authentication credential (e.g., userid and password). Once the first factor authentication credential is satisfied, the application server contacts the authentication server to determine whether the user is a subscriber of the multi-channel authentication service. If the user is a subscriber of the multi-channel authentication service, the authentication server then furnishes the user (via the application server) HTML instructions to instruct the user's client browser to establish a separate communication channel (e.g., using AJAX technology, for example) with the authentication server. The communication in this separate communication channel may be made secure by using encryption technique, as will be discussed later herein. The secured channel between the user's browser and the authentication server on this separate second channel performs the additional authentication.

In an implementation, the client browser and the authentication server both know a shared secret. A portion of the shared secret is referred to herein as "known fact" or KF, which is known to both the authentication server and the client browser. The known fact may be any data, information, or fact, mutually designated as "known" by both the authentication server and the client browser. For example, the known fact may be some specific data field (e.g., account number or telephone number) designated by the merchant to be the shared secret for the additional authentication.

The authentication between the authentication server and the client browser is a two-way encrypted authentication. If the client browser can authenticate itself to the authentication server using the shared secret (which is known to both the authentication server and the client browser), and if the authentication server can authenticate itself to the client browser using the shared secret, then authentication is deemed successful. Security is enhanced by the use of an out-of-band communication channel (e.g., email, phone, etc.) during the activation process when the user first registers with the multi-channel authentication system (a one-time process for each device) in order to communicate the known fact. For example, an email may be sent to the user to give the user the alphanumeric string for the known fact for the user to employ to bind the user to his credential.

Although the multi-channel authentication technique can provide additional security against some forms of security risks, a form of attack known as man-in-the-middle has presented challenges. Man-in-the-middle attack refers to the use by fraudsters of a device connected to client and connected to application server, by relaying requests and answers, to steal data and/or to act on behalf of the client browser to accomplish fraudulent purposes. In other words, the man-in-the-middle device can see all traffic and perform most or all actions that can be performed by the client browser, including for example modify the SSL protocol information.

Thus, even if a multi-channel authentication scheme is employed, the confidential communication can still be compromised after the client browser successfully completes the additional authentication with the authentication server since the MITM device is in-line with the communication between the client browser and the application server (e.g., XYZ bank).

In one or more embodiments of the present invention, IP-Address-Secure Multi-Channel Authentication (IPAS-MCA) techniques and arrangements are proposed. Generally speaking, the AS-MCA technique detects whether the IP source address for the communication between the client browser and the application server is the same as the source IP address for communication between the client browser and the authentication server on the secure authentication channel. If the two IP addresses differ, an unauthorized man-in-the-middle device is suspected, and the authentication will fail.

The features and advantages of the present invention may be better understood with reference to the figures and discussions that follow. FIG. 1 shows a typical multi-channel authentication scheme in which client browser 102 authenticates with both application sever 104 and authentication server 106. First client browser 102 contacts application server 104 to request authentication (130). At this stage, authentication typically employs a userid and password combination as is conventional. If the user is deemed a valid user based on userid/password, it is ascertained whether the user of client browser 102 is a subscriber of the multi-channel authentication system. The determination may be made by authentication server 106 by checking the user's identity (which is forwarded, 132, to authentication server 106 by application server 104) against its database of subscribers, for example.

If it is ascertained that the user is a subscriber of the multi-channel authentication system, authentication server 106 sends (134), via application server 104, to client browser 102 instructions (in the form of HTML code, for example) to instruct client browser 102 to establish a secure communication channel with authentication server 106 for the purpose of performing further authentication.

Using the instructions provided by authentication server 106 (which is sent to client browser 102 via application server 104), client browser 102 then establishes a secure communication channel (136a/136b) to authentication server 106. Via the secure communication channel, client browser 102 and authentication server 106 can perform further authentication. Authentication is typically two-way, with the client browser authenticating itself to the authentication server and vice versa.

Typically speaking, the additional authentication may require information known only to the user and/or specific to the communication device registered with the multi-channel authentication system as belonging to the user and authorized to perform the transaction. Thus, even if the userid and password are stolen, the fraudster still cannot complete authentication since the additional authentication with the authenticating server requires additional information specific to the user and/or the authorized user device.

Figure 2:
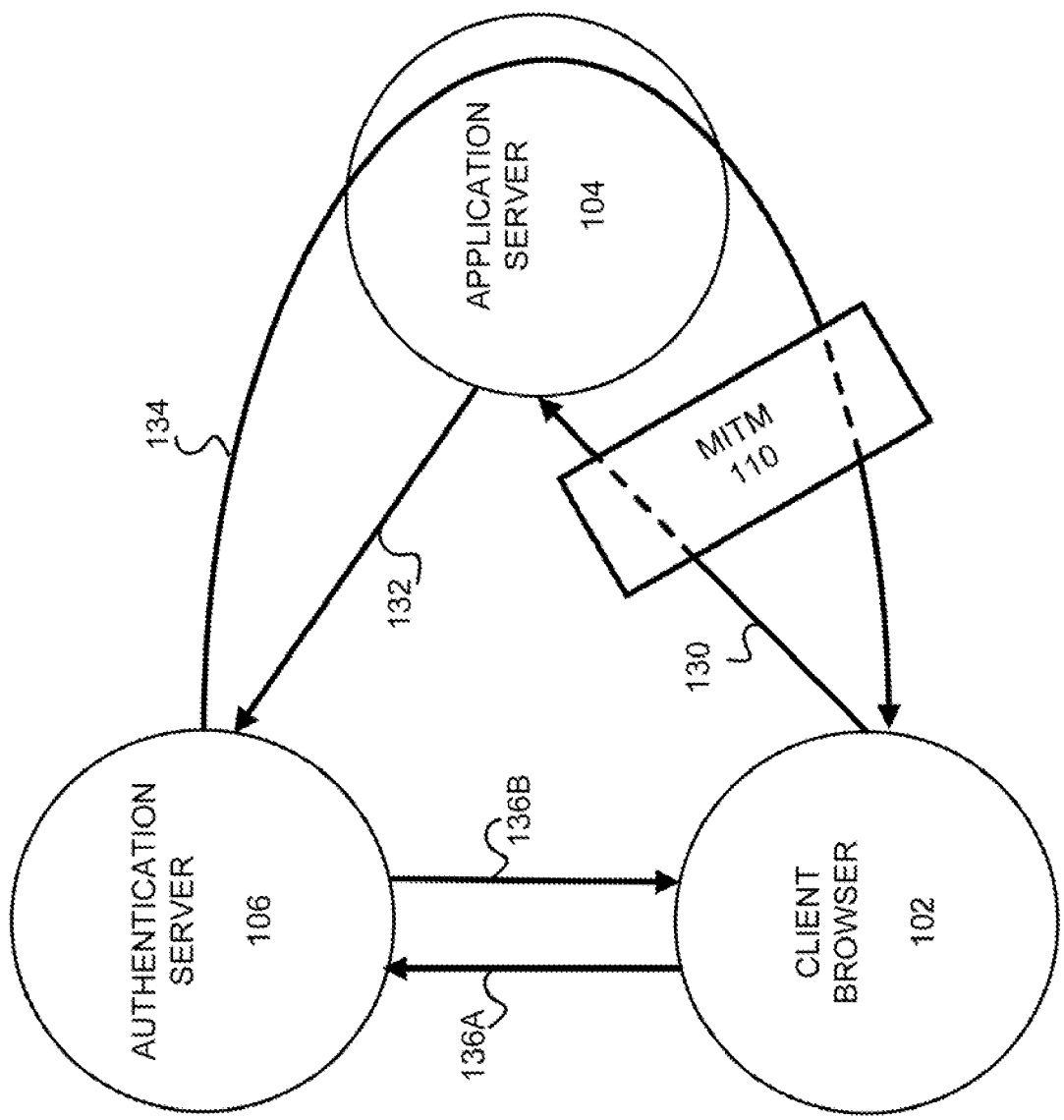
FIG. 2 shows the existence of a man-in-the-middle device, which has been implemented by the fraudster for the purpose of perpetrating fraud on the user.

FIG. 2 shows the existence of a man-in-the-middle device, which has been implemented by the fraudster for the purpose of perpetrating fraud on the user. In general, the fraudster tries to entice the user to make a connection to its device 110 based on some pretext. Once the connection is made based on some plausible pretext, the fraudster's device 110 then offers to connect to the application server 104 on behalf of the user's browser 102, with the fraudster's device 110 positioned in the middle of the communication between the client browser device 102 and application server 104. Thus, after client browser connects to MITM, the MITM device then connect to application server, as two connections. Each connection has a source IP address from the requesting party.

Since the MITM device relays messages between the client browser and the authentication server, first-factor authentication (using the user's userid and password) by browser 102 will be successful. Further, second-factor authentication between browser 102 and authentication server 106 on the separate secure channel will also be successful. Any subsequent communication between client browser 102 and application server 104 is then compromised, and since the MITM device 110 can perform almost any action on behalf of client browser 102, including for example SSL protocol information modification, a risk for fraud still exists.

Figure 3:
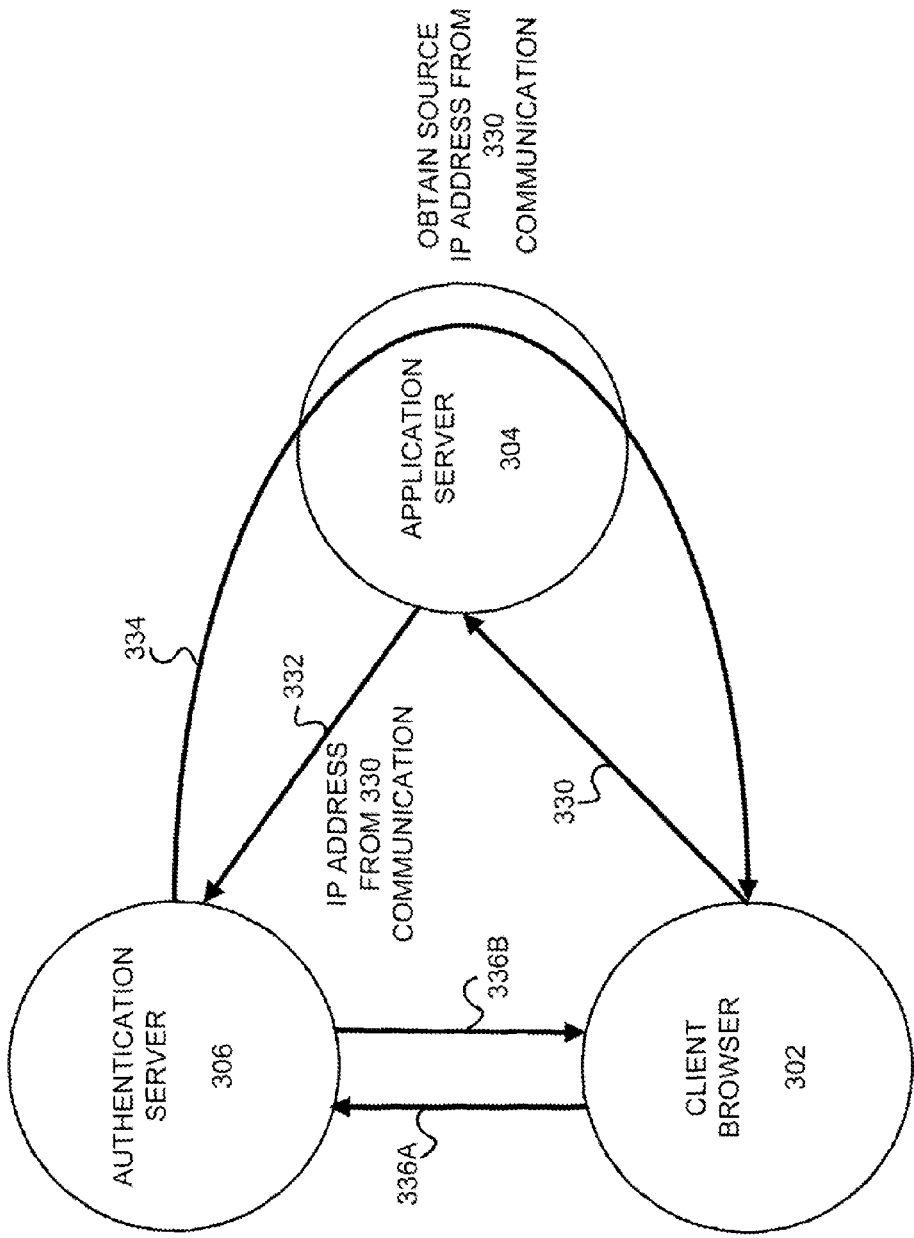
FIG. 3 shows, in accordance with an embodiment of the present invention, a schematic diagram of an IP-Address-Secure Multi-Channel Authentication (IPAS-MCA) scenario.

FIG. 3 shows, in accordance with an embodiment of the present invention, a schematic diagram of the IP-Address-Secure Multi-Channel Authentication (IPAS-MCA). In the example of FIG. 3, the steps of the IPAS-MCA technique is described although no fraudulent man-in-the-middle device exists in the example of FIG. 3. The case where a man-in-the-middle device exists will be discussed in connection with FIG. 4 herein.

Referring back to FIG. 3, first client browser 302 contacts (330) application server 304 to request authentication. At this stage, authentication again typically employs a userid and password combination as is conventional. In addition, application server 304 also notes the source IP address of the packets received. The source IP address is recorded. In the example of FIG. 3, since there are no man-in-the-middle device, the source IP address will be the IP address of client browser 302.

If the user is deemed a valid user based on the first-factor authentication, it is ascertained whether the user of client browser 302 is a subscriber of the multi-channel authentication system. The determination may be made by authentication server 306 by checking the user's identity (which is forwarded, 332, to authentication server 306 by application server 304) against its database of subscribers, for example. Further, the source IP address information recorded by the application server 304 is passed (332) to the authentication server 306.

If it is ascertained that the user is a subscriber of the multi-channel authentication system, authentication server 306 sends (334), via application server 304, to client browser 302 instructions (in the form of HTML code, for example) to instruct client browser 302 to establish a secure communication channel with authentication server 306 for the purpose of performing further authentication.

Using the instructions provided by authentication server 306 (which is sent to client browser 302 via application server 304), client browser 302 then establishes (336A/336B) a communication channel (using for example AJAX technology or a similar technology) to authentication server 306. Via the this additional communication channel, client browser 302 and authentication server 306 can perform further authentication.

Typically speaking, the additional authentication may require information known only to the user and/or specific to the communication device registered with the multi-channel authentication system as belonging to the user and authorized to perform the transaction. As mentioned, even if the userid and password are compromised, the fraudster still cannot complete authentication since the additional authentication with the authenticating server requires additional information specific to the user and/or the authorized user device.

Furthermore, authentication server 306 checks the source IP address from the data packets received from client browser 302 to determine if the IP address in data packets received from client browser 302 in the secure communication session between client browser 302 and authentication server 306 matches the IP address forwarded by application server 304 (which reflects the source IP address in data packets received by application server 304 during the first-factor authentication between client browser 302 and application server 304).

If these two IP addresses match, as would be the case in the example of FIG. 3 since there are no man-in-the-middle devices, authentication is deemed successful.

Figure 4:
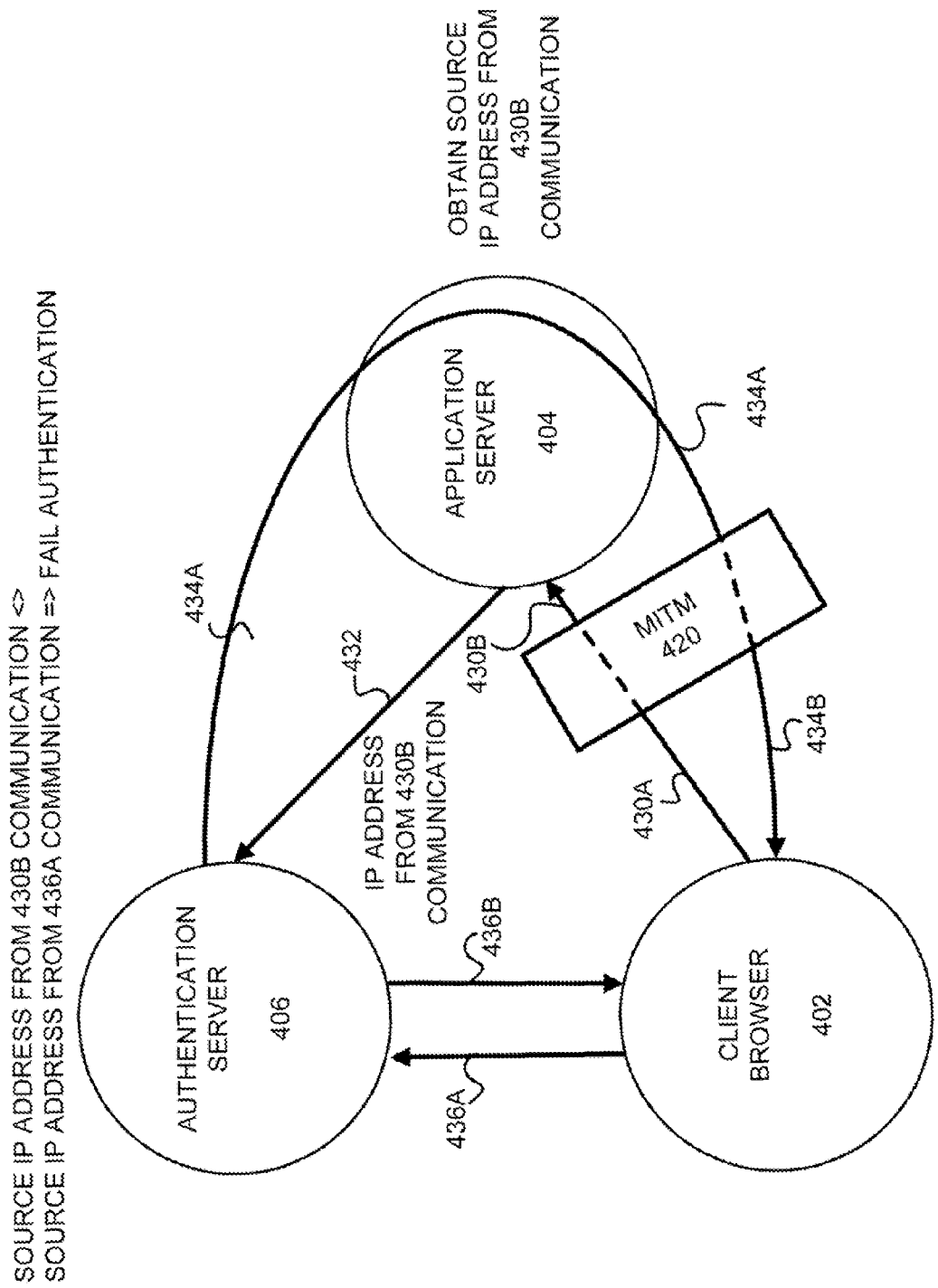
FIG. 4 shows, in accordance with an embodiment of the present invention, a schematic diagram of an IP-Address-Secure Multi-Channel Authentication (IPAS-MCA) scenario whereby a man-in-the-middle attack is thwarted.

FIG. 4 shows, in accordance with an embodiment of the present invention, a schematic diagram of the IP-Address-Secure Multi-Channel Authentication (IPAS-MCA). In the example of FIG. 4, a man-in-the-middle device 420 is fraudulently interposed in the communication stream between the client browser 402 and the application server 404. Typically speaking, MITM device 420 may first establish communication with client browser 402 using a technique such as phishing, for example, to trick the user of client browser 402 into believing that the user of client browser 402 is communicating with application server 404. Once the communication between client browser 402 and MITM device 420 is established, MITM device 420 contacts application server 404 is open a communication channel. Subsequent communication between client browser 402 and application server 404 is relayed by MITM device 420.

Application server 404 requests authentication by client browser 402, and the request is relayed to client browser 402 by MITM 420. As mentioned, at this stage, authentication again typically employs a userid and password combination as is conventional. The request, after being relayed by MITM 420, is responded by client browser 402 with the userid/password combination. MITM 420 relays the userid/password to application server 404.

Application server 404 also notes the source IP address of the packets received. Since the data packets arrive from MITM device 420, the source IP address associated with MITM device 420 is recorded.

If the user is deemed a valid user based on the userid/password combination, it is ascertained whether the user of client browser 402 is a subscriber of the multi-channel authentication system. The determination may be made by authentication server 406 by checking the user's identity (which is forwarded, 432, to authentication server 406 by application server 404) against its database of subscribers, for example. Further, the source IP address information recorded by the application server 404 (which reflects the IP address of MITM device 420 from the communication of 430B in this example) is passed (see reference arrow 432) to the authentication server 406.

If it is ascertained that the user is a subscriber of the multi-channel authentication system, authentication server 406 sends (434A), via application server 404, to client browser 402 instructions (in the form of HTML code, for example) to instruct client browser 402 to establish a secure communication channel with authentication server 406 for the purpose of performing further authentication. These instructions are relayed (434B) by MITM 420 to client browser 402.

Using the instructions provided by authentication server 406 (which is sent to client browser 402 via application server 404), client browser 402 then establishes a communication channel (436A/436B) to authentication server 406. Via this communication channel, client browser 402 and authentication server 406 can perform further authentication. Note that the instruction from authentication server 406 may include challenge/response which MITM 420 is unable to respond since MITM 420 does not have the shared secret. In this case, MITM 420 passes the instructions from authentication server 406 to client browser 402 to allow client browser 402 to answer the challenge/response. Client browser 402 then establishes the communication channel with authentication server 406 as instructed.

Furthermore, authentication server 406 checks the source IP address from the data packets received from client browser 402 (from the communication designated by reference number 436A) to determine if the IP address in data packets received from client browser 402 in the secure communication session between client browser 402 and authentication server 406 matches the IP address forwarded by application server 404 (which reflects the source IP address in data packets received—430B—by application server 404 during the first-factor authentication between client browser 402 and application server 404).

Since the IP address recorded by application server 404 and passed on to authentication server 406 reflects the IP address of the MITM device 420, this IP address will not match the IP address of client browser, which is obtained by authentication server 406 from the communication between client browser 402 and authentication server 406. In this case, authentication will fail.

As can be appreciated from the foregoing, embodiments of the invention extends the security afforded by the multi-channel authentication technique by further implementing defense against a man-in-the-middle attack. If the userid/password combination is stolen, the multi-channel authentication scheme can prevent subsequent authentication by the fraudster since the fraudster is unlikely to possess the information (whether explicitly provided by the user or automatically provided by an authorized communication device through which the user performs the online transaction authentication) needed for secondary authentication on the separate secure channel. More importantly, if a man-in-the-middle device is fraudulently interposed in the communication path between the client browser and the application server, the IPA-MCA technique can detect the presence of such fraudulent man-in-the-middle device by comparing IP addresses and prevent authentication and the subsequent fraudulent transactions.

The application incorporates by reference an earlier filed, currently pending patent application entitled "Hardware-Bonded Credential Manager Method and System," filed in the USPTO on Apr. 15, 2008, U.S. application Ser. No. 12/103,654.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for multi-factor authenticating of a user using an application server and an authentication server, said user interacting with said application server and said authentication server, said user communicating with at least one of said application server and said authentication server using a user browser program, comprising:
   authenticating using said application server said user using first factor authentication credentials;
   providing, from said application server to said authentication server, a first source IP address associated with a request for said authenticating using said first factor authentication credentials;
   instructing said user to establish a separate communication channel between said user browser program and said authentication server to perform additional authentication;
   comparing said first source IP address with a second source IP address, said second source IP address associated with communication from said user to said authentication server using said separate communication channel; and
   if said first source IP address does not match said second source IP address, failing authentication of said user.

2. The method of claim 1 wherein the first factor authentication credentials include at least userid and password.

3. The method of claim 1 further comprising ascertaining whether said user is a subscriber of a multi-factor authenticating service prior to instructing said user to establish said separate communication channel between said user browser program and said authentication server to perform additional authentication.

4. The method of claim 1 wherein said additional authentication includes authenticating using a shared secret between said authentication server and said user browser program.

5. The method of claim 4 wherein said shared secret includes a known fact.

6. The method of claim 5 wherein said known fact is provided by said user using an out-of-band communication channel during registration.

7. The method of claim 6 wherein said out-of-band communication channel includes a voice call.

8. The method of claim 1 wherein said additional authentication is performed with encryption.

9. The method of claim 1 wherein said additional authentication is a two-way authentication between said authentication server and said user browser program.

10. The method of claim 1 wherein said instructing said user to establish said separate communication channel between said user browser program and said authentication server to perform additional authentication involves AJAX technology.

11. The method of claim 1 wherein said instructing said user to establish said separate communication channel between said user browser program and said authentication server employs HTML.

12. A computer-implemented method for multi-factor authenticating of a user using an application server and an authentication server, said user interacting with at least one of said application server and said authentication server using a user browser program, comprising:
   receiving from said application server a first source IP address associated with a request for authenticating from said user browser program to said application server;
   receiving from said user browser program a request to perform additional authentication between said user browser program and said authentication server using a separate communication channel from a communication channel employed to communicate between said application server and said authentication server;

comparing said first source IP address with a second source IP address, said second source IP address associated with said request to perform said additional authentication between said authentication server and said user browser program; and if said first source IP address does not match said second source IP address, failing authentication of said user.

13. The method of claim 12 wherein said authenticating between said user browser program to said application server includes authenticating using first factor credentials.

14. The method of claim 12 wherein the first factor authentication credentials include at least userid and password.

15. The method or claim 12 further comprising ascertaining whether said user is a subscriber of a multi-factor authenticating service prior to instructing said user to establish said separate communication channel between said user browser program and said authentication server to perform said additional authentication.

16. The method of claim 12 wherein said additional authentication includes authenticating using a shared secret between said authentication server and said user browser program.

17. The method of claim 16 wherein said shared secret includes a known fact.

18. The method of claim 17 wherein said known fact is provided by said user using an out-of-band communication channel during registration.

19. The method of claim 12 wherein said additional authentication is a two-way authentication between said authentication server and said user browser program.

20. The method of claim 12 wherein said additional authentication is performed with encryption.

* * * * *